Patented June 22, 1926.

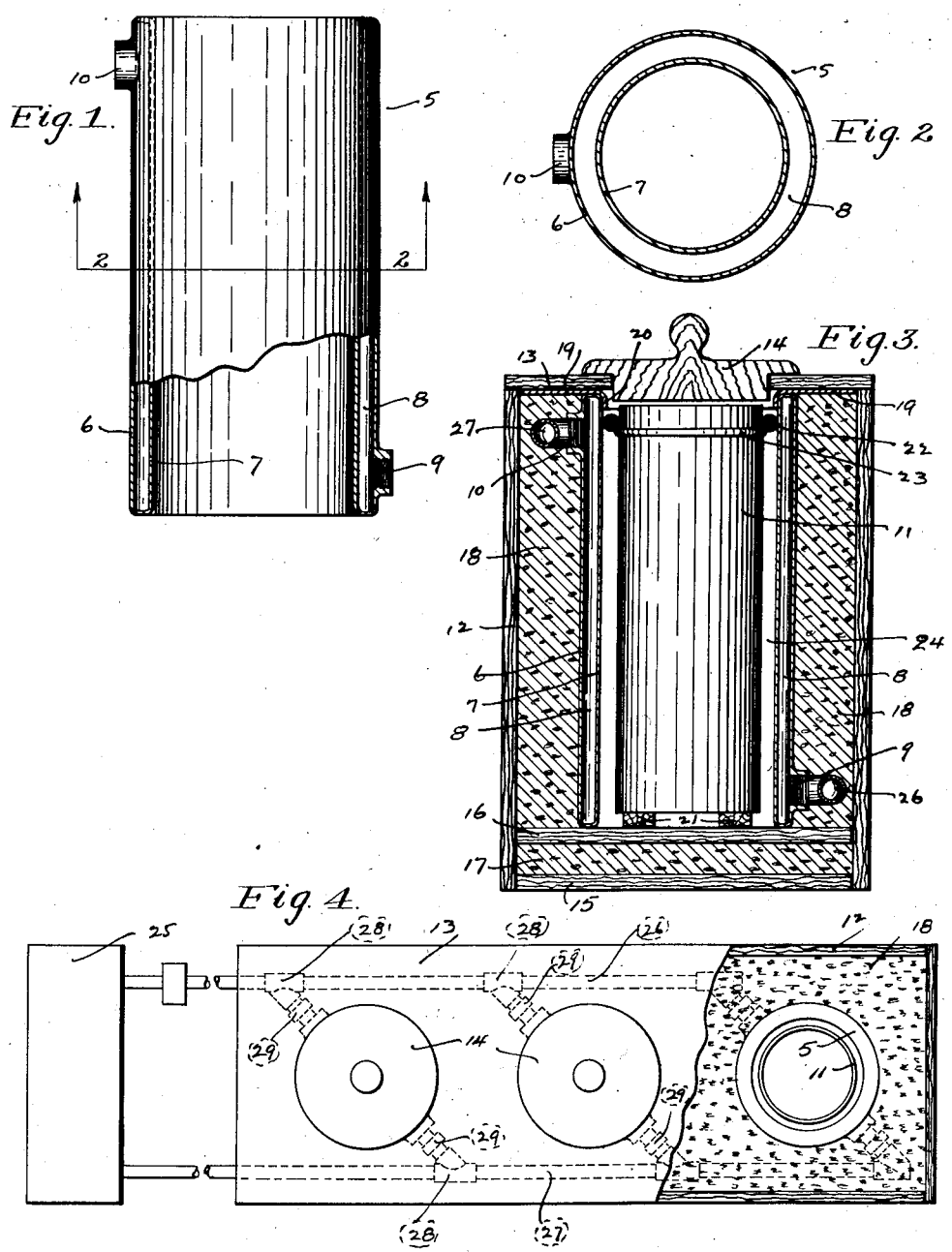

1,589,348

UNITED STATES PATENT OFFICE.

EUGENE L. BARNES, OF BUFFALO, NEW YORK.

REFRIGERATING UNIT.

Application filed September 14, 1923. Serial No. 662,741.

My invention relates in general to a refrigerating unit, and in particular to a refrigerating cylinder adapted for use in ice cream cabinets.

It is well known to those skilled in the art that the icing of ice cream cabinets is an expensive operation requiring considerable time and labor, as well as expensive equipment.

The principal object of my invention has been to overcome the disadvantages above pointed out and to provide a refrigerating cylinder which may be conveniently placed in an ice cream cabinet and connected to any suitable refrigerating apparatus for maintaining the desired temperature within the cabinet.

Other objects have been to provide a refrigerating cylinder which shall be light in weight, and strong and durable in construction, and convenient to use in existing cabinets.

The above objects and advantages have been accomplished by the device shown in the accompanying drawings, of which:

Fig. 1 is a side elevation of my refrigerating cylinder, partly in section.

Fig. 2 is a plan, sectional view of the same, taken on line 2—2 of Fig. 1.

Fig. 3 is a sectional elevation of my refrigerating unit.

Fig. 4 is a plan view, partly in section, of a three-hole ice cream cabinet equipped with my invention.

While my cylinder may be used in any existing ice cream cabinet, I have in the accompanying drawings shown a refrigerating unit embodying my invention.

Referring to the drawings, 5 represents my refrigerating cylinder, which is provided with an outer wall 6 and an inner wall 7. These walls are arranged in interspaced relation, whereby a chamber 8 is provided. The chamber is provided with an inlet 9, preferably at the bottom of the cylinder, and with an outlet 10, preferably arranged on the opposite side and at the top of the cylinder. The cylinder does not have a top or bottom over its entire area, but it is provided with a clear space through the entire length of the same for the reception of the can 11 of ice cream.

In Figs. 3 and 4 of the drawings, I have shown my cylinder as applied to an ice cream cabinet similar to the standard design. When my cylinder is used in the cabinet, it is not necessary that the inner wall of the cabinet be used, since the cylinder itself provides such an inner wall. The cabinet is provided with an outer wall 12, and a top 13 which is provided with the usual opening, having a cover or stopper 14. A bottom 15 is provided for the cabinet, and also a false bottom 16, between which is disposed cork or other suitable temperature insulating material.

As shown in Fig. 3, my refrigerating cylinder rests upon the false bottom 16, and extends to a point near the top of the outer casing 12. Cork 18, or other temperature insulating material, is packed in the space between the outer wall 6 of the cylinder and the outer wall 12 of the cabinet. The top of the insulation 18 is covered by means of a metallic plate 19 of suitable material. The plate is provided with a downwardly extending flanged portion 20, which extends into the upper end of the refrigerating cylinder, whereby the cylinder and the packing are efficiently covered, thus making the cabinet sanitary.

The inner wall 7 of my refrigerating cylinder is made of such a size that the can 11 of ice cream may easily be placed within the cylinder. The can 11 is preferably kept separated from the false bottom 16 by means of a number of cleats or wooden strips 21, whereby the bottom of the can will be exposed to substantially the same temperature as the exterior thereof. In order to prevent atmospheric air from passing into the air space 24 and around the can 11, when the cover 14 is removed, I provide a gasket or closure 22, preferably round in cross-section, which is placed around the upper end of the can 11 when the same is inserted within the cylinder. This gasket is held in place by means of the usual bead 23 at the upper end of the can.

In Fig. 4, where I show a three-hole ice cream cabinet, I show the refrigerating cylinders connected to each other and to a suitable refrigerating machine 25. The cylinders 5 are preferably arranged with their inlets and outlets at an angle of 45° with the side of the cabinet, whereby a more compact arrangement is obtained. A manifold 26, preferably, connects the inlet openings 9 of the cylinders, and a manifold 27 connects the outlet openings 10 of the cylinders. These manifolds are preferably of suitable piping, which is provided at spaced intervals with 45° T-fittings 28, which are conveniently connected to the inlet and outlet openings preferably by means of union fittings 29.

Any suitable form of refrigerating machine may be used in connection with my refrigerating cylinder, and I have, therefore, shown at 25 a conventional form of machine.

By the use of my cylinder in an ice cream cabinet, it will be seen that the contents of the ice cream cabinet can be kept at any desired temperature without the trouble and inconvenience entailed by the daily replenishment of the ice as in the ordinary type of cabinet. The cabinet may be kept more sanitary, and the refrigerating machine may be placed at any suitable or desired location, preferably in the basement of the building, where the cabinet is located.

It will be clear from the foregoing, that no coil is used in connection with my cylinder, but that the refrigerant itself is circulated through the space 8 of the cylinder. It is obvious that, because of the shape of the cylinder, a very light, strong, and fluid-tight device may be made without the danger of leakage due to pressure exerted on the surfaces of the walls of the cylinder.

Having thus described my invention, what I claim is:—

A refrigerating unit comprising a cabinet having a false bottom, a refrigerating cylinder formed with open ends within the cabinet and resting upon the false bottom, insulation between the outer wall of the cabinet and the cylinder, and a metallic plate extending over the top of the insulation and the cylinder.

In witness whereof, I have hereunto signed my name.

EUGENE L. BARNES.